United States Patent [19]  
Prooi et al.

[11] 4,343,932  
[45] Aug. 10, 1982

[54] UNSATURATED POLYESTER COMPOSITION

[75] Inventors: Jacob J. Prooi, Zwolle; Waltherus J. Sep, Doorn; Wilhelmina Westerhof, Zwolle, all of Netherlands

[73] Assignee: Internationale Octrooi Maatschappij "Octropa" BV, Rotterdam, Netherlands

[21] Appl. No.: 214,981

[22] Filed: Dec. 10, 1980

[30] Foreign Application Priority Data

Dec. 14, 1979 [NL] Netherlands ......................... 79 09040

[51] Int. Cl.³ .................... C08F 283/00; C08G 63/52
[52] U.S. Cl. ..................................... 528/303; 523/500; 525/36; 525/39; 525/40; 525/921
[58] Field of Search ................. 525/36, 39, 40, 921; 528/303

[56] References Cited

U.S. PATENT DOCUMENTS 3,153,005 10/1964 Minter ................. 528/304
3,631,224 12/1971 Baum .................... 525/36
3,905,943 9/1975 Gormley ............... 528/303
4,049,628 9/1977 Weiss et al. .......... 528/303

FOREIGN PATENT DOCUMENTS 1040780 9/1966 United Kingdom .......... 525/36

Primary Examiner—Ronald W. Griffin  
Attorney, Agent, or Firm—Cushman, Darby & Cushman

[57] ABSTRACT

The invention provides unsaturated polyester compositions which can be cured to form flexible objects, which compositions comprise terminal 1,2-alkene dicarboxylic acid in an amount of 1–25, preferably 3–15 mol-percent, calculated on the total amount of dicarboxylic acid, and 1–8, preferably 2.5–6 mol-percent of the dicarboxylic acids in the chain of the polyester consists of trans-1,2-alkene dicarboxylic acid.

10 Claims, No Drawings

UNSATURATED POLYESTER COMPOSITION

The invention relates to unsaturated polyesters substantially based on a diol component and a dicarboxylic acid component and having an acid value between 10 and 60 and a hydroxyl value between 0 and 30.

It is known that mixtures of unsaturated polyesters with reactive monomers can be cured under the influence of initiator/accelerator, initiator/high temperature or initiator/light combinations. In order to achieve curing, the (poly)hydroxyl compounds and/or the (poly)carboxylic acids, forming the raw materials for the polyester, should contain double bonds, for example groups derived from maleic or fumaric acid.

It is known, inter alia from U.S. Pat. No. 2,801,945 and U.S. Pat. No. 3,153,005, that more flexible cured polyester parts can be obtained by decreasing the mol-percentage of the incorporated unsaturated component(s) during the preparation of the basic polyester.

It is also known that the reaction of hydroxyl-terminated oligo-esters (Dutch Pat. Appln. No. 7014514) or hydroxyl-terminated polyesters which do not contain unsaturated dicarboxylic acid in the chain (RGCP, Plastiques 3, 41 (1966)) with maleic acid anhydride results in the formation of unsaturated polyesters which, after curing in the presence of a monomer, are more flexible in character.

Furthermore, British Pat. Specn. No. 1,040,780 discloses unsaturated polyester compositions for moulding hard objects which contain as the dicarboxylic acid ingredient mainly 1,2-alkene dicarboxylic acid (maleic and fumaric groups). According to the examples at least 80 mol-% of alkene dicarboxylic acid is used or none at all.

The polyesters known from the above art have a number of drawbacks, which appear from the aforementioned literature. It is particularly of practical importance that their keeping quality (storage stability has appeared to be insufficient and that curing and through-hardening were poor, in connection with the long gel time of said polyesters. For example, in practice a product is required with a storage life of six months at 20° C., which corresponds approximately to a storage life of at least 16 h at 80° C. These drawbacks are largely overcome by using unsaturated polyesters of which the molecules have been built up predominantly from groups derived from a diol component and a dicarboxylic acid component, in which terminal alkene dicarboxylic acid groups are present in an amount of 1-25 mol-percent, calculated on the total amount of carboxylic acid, and the dicarboxylic acid groups in the chain* consist of 1-8 mol-percent of trans-alkene dicarboxylic acid, and which polyester has an acid value between 5-60, preferably 16-30, and a hydroxyl value of 0-30, preferably 0-20.

*(excluding the terminal dicarboxylic acid groups)

The invention particularly relates to unsaturated polyesters in which the amount of alkene dicarboxylic acid chain stopper is from 3 to 15 mol-percent of the total amount of carboxylic acid. Preferably the dicarboxylic acid in the chain consists for 2.5 to 6 mol-percent of trans-1,2-alkene dicarboxylic acid.

Apart from the properties indicated above, the polyesters prepared according to the invention normally have the following valuable characteristics:

(1) curing, also at low temperature (0°–20° C.) can be effected with a standard curing system (e.g. benzoyl-peroxide/amine);
(2) short gel times (from 10 to 20 minutes) at low temperature can be realised while maintaining:
(3) good keeping qualities: at low temperature (e.g. 20° C. more than 6 months) at high temperature (e.g. 80° C. more than 16 hours)
(4) the viscosity of the polyester, dissolved in a reactive monomer, can be adjusted with this monomer at values from 0.35 to 1 Pa.s (at 20° C.) without adversely affecting the properties of the cured polyester. The advantage of this is that this polyester type can be worked up and applied in many different ways (spraying, brushing, injecting, pressing, etc.).

After curing, the polyesters according to the invention, dependent on the raw materials used, show a better combination of the mechanical properties than the cured polyesters known in the art.

The diol component predominantly consists of dihydroxy compounds but it may partly comprise, e.g. up to 20 mol-percent, of a triol, in which case it is often suitable to compensate the average functionality, e.g. by incorporating the same molar amount of monohydroxy compound. Aliphatic alcohols, cyclo-aliphatic alcohols and aromatic alcohols can be used. Very suitable examples are: ethylene glycol, propylene glycol-1,2-propylene glycol-1,3diethylene glycol, triethylene glycol, dipropylene glycol, neopentyl glycol, 1,4-cyclohexane dimethanol, 1,6-hexane diol, 1,5-pentane diol, 1,4-butane diol, 1,3-butane diol, 1,2-butane diol, pinacol, 2,2-bis[4-(2-hydroxy-propoxy)finyl]propane and other addition products of bisphenol A with several molecules of propylene oxide or ethylene oxide, neopentylglycol monoester of hydroxy pivalic acid, 2,2,4-trimethyl pentane diol-1,3, 3-methyl pentane diol, tris(-hydroxy-ethyl)isocyanurate, trimethylol propane, trimethylol ethane, glycerol.

The dicarboxylic acid component consists of both trans-1,2-alkenedicarboxylic acid and another dicarboxylic acid. The latter dicarboxylic acid can be aliphatic, aromatic, cycloaliphatic dicarboxylic acid or an alkene dicarboxylic acid that has no trans-1,2-configuration.

Suitable trans-1,2-alkene dicarboxylic acids are fumaric acid and mesaconic acid. Fumaric acid is preferred.

A suitable other dicarboxylic acid is preferably aliphatic, aromatic or cycloaliphatic dicarboxylic acid having 4–36 C-atoms. Preferably, the dicarboxylic acid contains from 6 to 20 carbon atoms. Examples of acids that can be used here are: succinic acid, adipic acid, azelaic acid, sebacic acid, dimeric fatty acids, isophthalic acid, terephthalic acid, phthalic acid, tetrahydrophthalic acid, hexahydrophthalic acid, endomethylene tetrahydrophthalic acid, hexachloroendomethylene tetrahydrophthalic acid, dimethylterephthalate and itaconic acid. It is also possible to use e.g. trimellitic acid, 1,2,3,4-butane-tetracarboxylic acid, 1,2,4,5-benzenetetracarboxylic acid or 1,4,5,8-naphthalene tetracarboxylic acid, the higher functionality then often being compensated by means of monocarboxylic acid.

Dicyclopentadienyl units and/or cyclopentadienyl units can also be incorporated. Dicyclopentadiene can also be incorporated e.g. by reaction with alkene dicarboxylic acid.

The other dicarboxylic acid can be e.g. cis-alkene dicarboxylic acid, such as maleic acid and citraconic acid, or a trans-alkene dicarboxylic acid not having a 1,2-configuration, or e.g. itaconic acid.

The unsaturated polyesters according to the invention can be prepared by reacting the raw materials indicated or their functional derivatives, such as acid anhydrides, lower alkyl esters and the like, in a manner known per se.

Furthermore, it should be considered that during preparation the cis-compound is wholly or largely converted into the trans-compound.

The unsaturated polyester according to the invention possesses terminal 1,2-alkene dicarboxylic acid groups, optionally free carboxyl groups derived from other di and polycarboxylic acids.

The unsaturated polyester is preferably prepared in two steps, in which in a first step an excess of glycol component is esterified with a dicarboxylic acid component, and in a second step rapid esterification is effected with 1,2-alkene dicarboxylic acid, the dicarboxylic acid component of the first step consisting for 1-8 mol-percent of trans-1,2-alkene dicarboxylic acid, or being isomerized to it, and the rapid esterification in the second step being effected with alkene dicarboxylic acid or a derivative thereof, in which step such an amount of this acid or derivative is chosen as to form from 1 to 25 mol-percent of the total dicarboxylic acid. In practice the first step is mostly carried out at a reaction temperature of 190°–220° C. to an acid value <10 and an OH—value of 15-60, after which in a second step at a temperature of 110°–170° C. in 0.5 to 4 hours a further reaction takes place with cis-1,2-alkene dicarboxylic acid anhydride. At this lower reaction temperature ester interchange reactions are avoided. This esterification is suitably carried out in an inert atmosphere, the reaction water being discharged, e.g. azeotropically. If the unsaturated polyester has been cooked, it is cooled and, as a rule, diluted with one or more vinyl compounds such as e.g. styrene, vinyl toluene, t-butylstyrene, divinyl benzene, alkyl acrylates, alkyl methacrylates, chlorostyrene, bromostyrene, vinyl acetate, vinyl propionate, vinyl pivalate, allyl phthalate, diallyl phthalate, triallyl cyanurate, triallylisocyanurate, 1,3-butane dioldimethacrylate, 1,4-butane diol dimethacrylate and alkylvinylethers, and, if necessary, polymerization retarders are added, such as e.g. hydroquinone, p-benzoquinone, chloranil, 2,3-dichloro-5,6-dicyano-p-benzoquinone, p-tert-butylcatechol, 2-tert-butyl-1,4-hydroquinone, 2,5-ditert-butyl-1,3-hydroquinone, copper naphthenate, 1,4-naphthoquinone, hydroquinone monomethylether and hydroquinone monoethylether.

The mixtures of unsaturated polyester and vinyl monomer can be cured in the usual way by means of a peroxide initiator. This will often be followed by the addition of fillers, pigments, colorants and the like. Articles can thus be obtained which wholly or partly consist of elastic polyester. These articles can be used, for example, as cements, bonding agents, coating compositions, e.f. for roofs, insulating material and anti-sliding agents. Apart from the better keeping qualities, particularly the mechanical properties were found to be very favourable.

EXAMPLES 1-25

(The Examples 2-25 from Tables I-IV were carried out analogous to Example 1).

EXAMPLE 1

At room temperature, 1102 g (10.60 mol) neopentyl glycol, 708 g (4.85 mol) adipic acid and 35 g (0.30 mol) fumaric acid were charged into a flask having a capacity of 3 liters and being fitted with stirrer, thermometer, vigreux, condenser and a nitrogen inlet tube. This mixture was subsequently heated to 100° C., followed by the addition of a further 708 g (4.85 mol) adipic acid. This mixture was esterified at 215° C., water distilled off, until an acid value of 5.4 had been reached. The viscosity of a mixture of 60 parts of this polyester, mixed with 40 parts of styrene, was then 0.85 Pa.s (measured with an Emila viscosimeter at 20° C.). The polyester was now cooled to 150° C. and 78.4 g (0.80 mol) maleic acid anhydride was added. After 2 h at 150° C. the mixture was cooled to 100° C. When this temperature had been reached, 1340 g styrene and 134 mg hydroquinone were added. The mixture thus obtained had an acid value of 14.7, a hydroxyl value of 6.3 and a solids content of 56.5%, and was adjusted to a viscosity (Emila 20° C.) of 0.76 Pa.s.

The gel time of this polyester resin at 20° C. with a 3% benzoyl peroxide (50%) and 0.3% N,N-dimethyl-p-toluidine was 14.3 min. The storage life at 80° C. was 30 hours. Polyester resin was cured at 20° C. with 3% BPO (50%) and 0.3% N,N-dimethyl-p-toluidine for 48 hours, after which the following characteristics were determined:

Short A hardness (DIN 53505): 90
Shore D hardness (DIN 53505): 40
Tensile strength (DIN 53455): 9.1 MPa
Elongation at break (DIN 53455): 288%.

The preparation of the polyester was carried out in two steps, unless otherwise indicated. In the first step the chain or backbone of the polyester is prepared using excess diol. In the first step 0.30 mol of fumaric acid and 9.70 mol of adipic acid were esterified so that the chain contained 3 mol-percent of trans-alkene dicarboxylic acid.* In the second step 0.80 mol of maleic acid was introduced and caused to react with the terminal hydroxyl groups of the polyester obtained in the first step. The reaction temperature was such as to prevent ester interchange reactions so that terminal maleic acid (1,2-alkene dicarboxylic acid) groups were introduced in an amount of 0.80 mol on a total amount of dicarboxylic acid of 10.80 mol, which constitutes 7.4-mole-percent.
*(terminal fumaric acid is ignored here, because the acid value of this intermediate polyester is relatively low)

In the case of a polyester prepared in one step the calculations for determining the amount of terminal alkene dicarboxylic acid and the amount in the backbone of the polyester are more elaborate. It must be assumed that the same random distribution of the dicarboxylic acid groups over the backbone and over the terminal group occurs. The mol-percentage of alkene dicarboxylic acid in the chain is calculated from the composition of the total dicarboxylic acid charge. In Example 7, 1,1 moles of fumaric acid are used on a total of 10.8 moles of dicarboxylic acid, i.e. 10.2% is fumaric acid. This molar percentage also applies to the composition of the terminal dicarboxylic acid groups.

The total amount of polyester obtained is calculated from the amount of starting materials used and corrected for the theoretical amount of water of reaction formed. In Example 7 this is about 2370 g. The number of moles of terminal dicarboxylic acid is calculated from the acid value of 17.8 for the diluted polyester, which has a solids content of 57.9%. Consequently, for the undiluted polyester the acid value is:

$$\frac{17.8}{0.579} = 30.7 \text{ (mg KOH/g)}.$$

The total amount of polyester contained $$\frac{30.7 \times 2370}{56100} = 1.3 \text{ moles of terminal carboxylic acid groups,}$$

of which 10.2%, equalling 0.13 mole, is fumaric acid. Consequently, the amount of terminal fumaric acid in moles, calculated on the total number of moles of dicarboxylic acid, is 10.6 (=1.2%).

By using this method one obtains for comparative examples 7, 10 and 11 the following figures for the molar percentages of fumaric acid in the chain: 10.2, 8.0 and 10.2, and for terminal fumaric acid: 1.2, 0.24 and 0.83, respectively, whereas for examples 24 and 25 these figures are: 7.3 and 5.6 (terminal) and 1.2 and 1.3 (in the chain).

TABLE I

| Examples: | | 2 | 3 | 4 | 5 | 6 | 7** | 8 |
|---|---|---|---|---|---|---|---|---|
| 1st Step - Raw Materials: | | | | | | | | |
| Propylene glycol | (gmol) | — | — | — | — | — | — | — |
| 1,4-cyclohexane dimethanol | (gmol) | — | — | — | — | — | — | — |
| Dipropylene glycol | (gmol) | — | 10.60 | — | — | — | — | — |
| Neopentylglycol (NPG) | (gmol) | 5.30 | — | 10.60 | 10.60 | 10.60 | 10.60 | 10.60 |
| Mono-NPG ester of hydroxy pivalic acid | (gmol) | — | — | — | — | — | — | — |
| Tris(hydroxyethyl)isocyanurate | (gmol) | 2.65 | — | — | — | — | — | — |
| Benzyl alcohol | (gmol) | 3.00 | — | — | — | — | — | — |
| Isophthalic acid | (gmol) | — | 4.85 | — | — | 4.85 | 4.85 | — |
| Adipic acid | (gmol) | 9.70 | 4.85 | — | — | 4.85 | 4.85 | 9.90 |
| Azelaic acid | (gmol) | — | — | 4.85 | 9.70 | — | — | — |
| Succinic acid | (gmol) | — | — | 4.85 | — | — | — | — |
| Endomethylene tetrahydrophthalic acid anhydride | (gmol) | — | — | — | — | — | — | — |
| Dimeric fatty acid | (gmol) | — | — | — | — | — | — | — |
| Fumaric acid | (gmol) | 0.30 | 0.30 | 0.30 | 0.30 | 0.30 | 1.10 | — |
| Dicyclopentadiene | (gmol) | — | — | — | — | — | — | — |
| 2nd Step - Raw materials: | | | | | | | | |
| Maleic acid anhydride | | 0.80 | 0.80 | 0.80 | 0.80 | 0.80 | — | 1.10 |
| Citraconic acid anhydride | | — | — | — | — | — | — | — |
| Method of preparation: | | | | | | | | |
| React. temp. max. in 1st step (°C.) | | 190 | 205 | 205 | 205 | 205 | 205 | 205 |
| React. temp. during 2nd step (°C.) | | 150 | 150 | 150 | 150 | 150 | — | 150 |
| Reaction time 2nd step (h) | | 2 | 2 | 2 | 2 | 2 | — | 2 |
| Polyester/styrene, during dilution | | 60/40 | 60/40 | 60/40 | 60/40 | 60/40 | 60/40 | 60/40 |
| Stabiliser: amount(ppm)/nature* | | 40/HQ | 40/HQ | 40/HQ | 40/HQ | 40/HQ | 40/HQ | 40/HQ |
| Data on diluted polyester: | | | | | | | | |
| Viscosity at 20° C. (Pa.s) | | 0.66 | 0.70 | 0.73 | 0.71 | 0.73 | 0.67 | 0.75 |
| Acid value | | 16.2 | 16.1 | 13.4 | 11.5 | 16.2 | 17.8 | 19.3 |
| Hydroxyl value | | 7.2 | 4.0 | 5.1 | 9.8 | 7.8 | 9.1 | 10.6 |
| Solids content (%) | | 54.8 | 58.7 | 56.7 | 57.6 | 57.3 | 57.9 | 62.6 |
| Gel time at 20° C. (min) | | 13.6 | 40.2 | 15.1 | 19.0 | 13.0 | 11.5 | 19.0 |
| Storage life at 80° C. (h) | | 144 | 8 | 56 | 20 | 37 | 60 | 12 |
| Data on cured polyester: | | | | | | | | |
| Shore A | - DIN 53505 | 94 | 95 | 93 | 85 | 97 | 95 | 87 |
| Shore D | - DIN 53505 | 50 | 53 | 38 | 28 | 67 | 55 | 30 |
| Tens. strength (MPa) | - DIN 53455 | 10.7 | 6.9 | 8.3 | 4.8 | 14.0 | 12.8 | 6.7 |
| Elong. at break (%) | - DIN 53455 | 228 | 278 | 303 | 290 | 198 | 135 | 280 |

*HQ: Hydroquinone
**Comp. Ex.
BHQ: mono tertiary butyl hydroquinone

TABLE II

| Examples: | | 9 | 10** | 11** | 12 | 13 | 14 | 15 |
|---|---|---|---|---|---|---|---|---|
| 1st Step - Raw Materials: | | | | | | | | |
| Propylene glycol | (gmol) | — | — | — | 2.00 | — | — | 2.00 |
| 1,4-cyclohexane dimethanol | (gmol) | — | — | — | — | 5.30 | — | — |
| Dipropylene glycol | (gmol) | — | — | — | — | — | — | — |
| Neopentylglycol (NPG) | (gmol) | 10.60 | 10.60 | 10.60 | 8.60 | 5.30 | 5.30 | 8.60 |
| Mono-NPG ester of hydroxy pivalic acid | (gmol) | — | — | — | — | — | 5.30 | — |
| Tris(hydroxyethyl)isocyanurate | (gmol) | — | — | — | — | — | — | — |
| Benzyl alcohol | (gmol) | — | — | — | — | — | — | — |
| Isophthalic acid | (gmol) | — | — | — | — | — | — | — |
| Adipic acid | (gmol) | 9.20 | 9.20 | 9.70 | 9.70 | 9.70 | 9.70 | 9.70 |
| Azelaic acid | (gmol) | — | — | — | — | — | — | — |
| Succinic acid | (gmol) | — | — | — | — | — | — | — |
| Endomethylene tetrahydrophthalic acid anhydride | (gmol) | — | — | — | — | — | — | — |
| Dimeric fatty acid | (gmol) | — | — | — | — | — | — | — |
| Fumaric acid | (gmol) | 0.80 | 0.80 | 1.10 | 0.30 | 0.30 | 0.30 | 0.30 |
| Dicyclopentadiene | (gmol) | — | — | — | — | — | — | — |

TABLE II-continued

| Examples: | 9 | 10** | 11** | 12 | 13 | 14 | 15 |
|---|---|---|---|---|---|---|---|
| 2nd Step - Raw materials: | | | | | | | |
| Maleic acid anhydride | 0.80 | — | — | 0.80 | 0.80 | 0.80 | 0.80 |
| Citraconic acid anhydride | — | — | — | — | — | — | — |
| Method of preparation: | | | | | | | |
| React. temp. max. in 1st step (°C.) | 190 | 190 | 205 | 205 | 205 | 205 | 205 |
| React. temp. during 2nd step (°C.) | 150 | — | — | 150 | 150 | 150 | 150 |
| Reaction time 2nd step (h) | 2 | — | — | 2 | 2 | 2 | 2 |
| Polyester/styrene, during dilution | 60/40 | 60/40 | 60/40 | 60/40 | 60/40 | 60/40 | 60/40 |
| Stabiliser: amount(ppm)/nature* | 40/HQ | 40/HQ | 40/HQ | 40/HQ | 40/HQ | 40/HQ | 40/BHQ |
| Data on diluted polyester: | | | | | | | |
| Viscosity at 20° C. (Pa.s) | 0.80 | 0.78 | 0.75 | 0.75 | 0.76 | 0.75 | 0.73 |
| Acid value | 13.7 | 4.4 | 12.1 | 15.1 | 16.7 | 12.4 | 16.2 |
| Hydroxyl value | 7.3 | 17.9 | 6.7 | 8.4 | 9.0 | 10.3 | 7.5 |
| Solids content (%) | 54.3 | 57.7 | 57.1 | 55.2 | 56.2 | 59.4 | 54.8 |
| Gel time at 20° C. (min) | 11.4 | 10.0 | 12.6 | 13.2 | 15.4 | 13.2 | 15.9 |
| Storage life at 80° C. (h) | 100 | 130 | 300 | 53 | 25 | 18 | 51 |
| Data on cured polyester: | | | | | | | |
| Shore A - DIN 53505 | 86 | 84 | 90 | 92 | 93 | 90 | 89 |
| Shore D - DIN 53505 | 36 | 29 | 40 | 42 | 45 | 38 | 39 |
| Tens. strength (MPa) - DIN 53455 | 8.8 | 7.1 | 6.7 | 9.8 | 12.5 | 6.8 | 10.1 |
| Elong. at break (%) - DIN 53455 | 170 | 238 | 163 | 238 | 285 | 310 | 245 |

*HQ: Hydroquinone
**Comp. Ex.
BHQ: mono tertiary butyl hydroquinone

TABLE III

| Examples: | 16 | 17 | 18 | 19 | 20 | 21 | 22 |
|---|---|---|---|---|---|---|---|
| 1st Step - Raw Materials: | | | | | | | |
| Propylene glycol (gmol) | — | 5.30 | — | — | — | — | — |
| 1,4-cyclohexane dimethanol (gmol) | — | — | — | — | — | — | — |
| Dipropylene glycol (gmol) | — | — | — | — | — | — | — |
| Neopentylglycol (NPG) (gmol) | 10.60 | 5.30 | 10.60 | 10.60 | 10.60 | 10.60 | 10.60 |
| Mono-NPG ester of hydroxy pivalic acid (gmol) | — | — | — | — | — | — | — |
| Tris(hydroxyethyl)isocyanurate (gmol) | — | — | — | — | — | — | — |
| Benzyl alcohol (gmol) | — | — | — | — | — | — | — |
| Isophthalic acid (gmol) | 4.95 | — | — | — | — | — | — |
| Adipic acid (gmol) | 4.95 | 9.70 | 6.70 | 7.70 | 9.80 | 9.50 | 9.80 |
| Azelaic acid (gmol) | — | — | — | — | — | — | — |
| Succinic acid (gmol) | — | — | — | — | — | — | — |
| Endomethylene tetrahydrophthalic acid anhydride (gmol) | — | — | 2.00 | — | — | — | — |
| Dimeric fatty acid (gmol) | — | — | 1.00 | — | — | — | — |
| Fumaric acid (gmol) | — | 0.30 | 0.30 | 2.30 | 0.20 | 0.20 | 0.20 |
| Dicyclopentadiene (gmol) | — | — | — | 1.00 | — | — | — |
| 2nd Step - Raw materials: | | | | | | | |
| Maleic acid anhydride | 1.10 | 0.80 | 0.80 | 0.40 | 1.10 | 1.70 | 0.30 |
| Citraconic acid anhydride | — | — | — | 0.40 | — | — | — |
| Method of preparation: | | | | | | | |
| React. temp. max. in 1st step (°C.) | 205 | 205 | 205 | 205 | 205 | 205 | 205 |
| React. temp. during 2nd step (°C.) | 150 | 150 | 150 | 150 | 150 | 150 | 150 |
| Reaction time 2nd step (h) | 2 | 2 | 2 | 2 | 2 | 2 | 2 |
| Polyester/styrene, during dilution | 60/40 | 60/40 | 60/40 | 60/40 | 60/40 | 63/37 | 60/40 |
| Stabiliser: amount(ppm)/nature* | 40/HQ | 40/HQ | 40/HQ | 40/HQ | 40/HQ | 40/HQ | 40/HQ |
| Data on diluted polyester: | | | | | | | |
| Viscosity at 20° C. (Pa.s) | 0.69 | 0.72 | 0.65 | 0.75 | 0.73 | 0.79 | 0.71 |
| Acid value | 20.5 | 18.3 | 13.0 | 16.9 | 17.8 | 27.2 | 8.1 |
| Hydroxyl value | 10.2 | 9.5 | 9.9 | 7.8 | 5.3 | 4.9 | 16.7 |
| Solids content (%) | 56.7 | 57.0 | 55.6 | 56.3 | 58.5 | 62.3 | 58.2 |
| Gel time at 20° C. (min) | 17.9 | 10.6 | 6.5 | 15.6 | 8.7 | 6.5 | 15.4 |
| Storage life at 80° C. (h) | 20 | 20 | 48 | 50 | 20 | 14+++ | 35 |
| Data on cured polyester: | | | | | | | |
| Shore A - DIN 53505 | 97 | 85 | 86 | 85 | 90 | 92 | 82 |
| Shore D - DIN 53505 | 68 | 30 | 36 | 35 | 41 | 41 | 35 |
| Tens. strength (MPa) - DIN 53455 | 14.8 | 8.9 | 11.6 | 13.0 | 6.3 | 6.5 | 5.4 |
| Elong. at break (%) - DIN 53455 | 94 | 373 | 263 | 380 | 270 | 210 | 360 |

*HQ: Hydroquinone
**Comp. Ex.
+++By adding a little inhibitor a storage life of at least 16 h is poss.
BHQ: mono tertiary butyl hydroquinone

TABLE IV

| Examples | | 23 | 24 | 25 |
|---|---|---|---|---|
| 1st Step - Raw Materials: | | | | |
| Propylene glycol | (gmol) | — | — | — |
| 1,4-cyclohexane dimethanol | (gmol) | — | — | — |
| Dipropylene glycol | (gmol) | — | — | — |
| Neopentylglycol (NPG) | (gmol) | 10.60 | 10.0 | 10.0 |
| Mono-NPG ester of hydroxy pivalic acid | (gmol) | — | — | — |
| Tris(hydroxyethyl)isocyanurate | (gmol) | — | — | — |
| Benzyl alcohol | (gmol) | — | — | — |
| Isophthalic acid | (gmol) | — | — | 5.05 |
| Adipic acid | (gmol) | 9.20 | 10.10 | 5.05 |
| Azelaic acid | (gmol) | — | — | — |
| Succinic acid | (gmol) | — | — | — |
| Endomethylene tetrahydrophthalic acid anhydride | (gmol) | — | — | — |
| Dimeric fatty acid | (gmol) | — | — | — |
| Fumaric acid | (gmol) | 0.10 | 0.80 | 0.60 |
| Dicyclopentadiene | (gmol) | — | — | — |
| 2nd Step - Raw Materials: | | | | |
| Maleic acid anhydride | | 2.50 | — | — |
| Citraconic acid anhydride | | — | — | — |
| Method of preparation: | | | | |
| React. temp. max. in 1st step (°C.) | | 205 | 205 | 205 |
| React. temp. during 2nd step (°C.) | | 130 | — | — |
| Reaction time 2nd step (h) | | 5 | — | — |
| Polyester/styrene, during dilution | | 68/32 | 68/32 | 70/30 |
| Stabiliser: amount(ppm)/nature* | | 40/HQ | 40/HQ | 40/HQ |
| Data on diluted polyester: | | | | |
| Viscosity at 20° C. (Pa.s) | | 0.77 | 0.74 | 0.69 |
| Acid value | | 38.9 | 36.9 | 40.0 |
| Hydroxyl value | | 7.3 | 4 | 8.2 |
| Solids content (%) | | 67.0 | 66.2 | 68.1 |
| Gel time at 20° C. (min) | | 4.9 | 16.3 | 15.7 |
| Storage life at 80° C. (h) | | 9+++ | 30.0 | 42.0 |
| Data on cured polyester: | | | | |
| Shore A | - DIN 53505 | 70 | 91 | 96 |
| Shore D | - DIN 53505 | 26 | 39 | 55 |
| Tens. strength (MPa) | - DIN 53455 | 4.3 | 8.3 | 13.4 |
| Elong. at break (%) | - DIN 53455 | 150 | 270 | 183 |

*HQ = Hydroquinone
+++By adding a little inhibitor a storage life of at least 16 h can be realised.

We claim:

1. Unsaturated polyester having an acid value between 5 and 60, and a hydroxyl value between 0 and 30, the molecules of which have been built up predominantly from groups derived from a diol component and a dicarboxylic acid component, characterized in that terminal 1,2-alkene dicarboxylic acid is present in an amount of 1–25 mol-percent, calculated on the total amount of dicarboxylic acid, and that the dicarboxylic acid groups in the chain consist for 1 to 8 mol-percent of trans-1,2-alkene dicarboxylic acid.

2. Unsaturated polyester according to claim 1, in which the acid value is 10–35 and the hydroxyl value is 0–20.

3. Unsaturated polyester according to claim 1, characterized in that the terminal 1,2-alkene dicarboxylic acid groups are present in an amount of from 3 to 15 mol-percent.

4. Unsaturated polyester according to claim 1, characterized in that the terminal 1,2-alkene dicarboxylic acid groups have been derived from maleic acid.

5. Unsaturated polyester according to claim 1, characterized in that the dicarboxylic acid groups in the chain consist for 92–99 mol-percent of saturated aliphatic, aromatic, cyclo-aliphatic or alkene dicarboxylic acids that do not have a trans-1,2-configuration.

6. Unsaturated polyester according to claim 1, characterized in that the dicarboxylic acid groups in the chain consist for 2.5–6 mol-percent of trans-1,2-alkene dicarboxylic acid.

7. Unsaturated polyester according to claim 1, characterized in that the trans-1,2-alkene dicarboxylic acid is fumaric acid.

8. Unsaturated polyester according to claim 1, characterized in that it has been dissolved in from 15 to 70 percent by weight of a vinyl monomer.

9. Process for the preparation of an unsaturated polyester, involving heating and reacting diol and dicarboxylic acids in one or more steps, characterized in that the starting materials are reacted in such relative quantities that the polyester shows an acid value between 5 and 60 and a hydroxyl value between 0 and 30, that the dicarboxylic acid in the chain consists for 1–8 mol-percent of trans-1,2-alkene dicarbocylic acid and the terminal dicarboxylic acid consists for 1–25 mol-percent of 1,2-alkene dicarboxylic acid when calculated on total dicarboxylic acid.

10. Process for the preparation of an unsaturated polyester according to claim 9, characterized in that the preparation is carried out in two steps, in which in the first step an excess of diol is esterified with a mixture of dicarboxylic acids or functional derivatives thereof, and in a second step rapid esterification with 1,2-alkene dicarboxylic acid or a derivative thereof is effected, and that the dicarboxylic acid mixture of the first step consists for 1–8 mol-percent of trans-1,2-alkene dicarboxylic acid, or is isomerized to it, and the rapid esterification in the second step is effected with 1,2-alkene dicarboxylic acid or a derivative thereof, the amount of this acid or derivative being chosen such as to form from 1 to 25 mol-percent of the total amount of dicarboxylic acid.

* * * * *